US007895033B2

(12) United States Patent
Joublin et al.

(10) Patent No.: US 7,895,033 B2
(45) Date of Patent: Feb. 22, 2011

(54) SYSTEM AND METHOD FOR DETERMINING A COMMON FUNDAMENTAL FREQUENCY OF TWO HARMONIC SIGNALS VIA A DISTANCE COMPARISON

(75) Inventors: Frank Joublin, Mainhausen (DE); Martin Heckmann, Frankfurt am Main (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 751 days.

(21) Appl. No.: 11/142,879

(22) Filed: May 31, 2005

(65) Prior Publication Data
US 2005/0278173 A1 Dec. 15, 2005

(30) Foreign Application Priority Data
Jun. 4, 2004 (EP) .................................. 04013275
Jul. 27, 2004 (EP) .................................. 04017773

(51) Int. Cl.
*G10L 11/00* (2006.01)
(52) U.S. Cl. ....................................... 704/200; 704/201
(58) Field of Classification Search ................. 704/250, 704/229, 500, 200, 201
See application file for complete search history.

(56) References Cited
U.S. PATENT DOCUMENTS

| 3,622,706 | A | * | 11/1971 | Kalfaian ..................... 704/250 |
| 3,629,510 | A | | 12/1971 | Anderson et al. |
| 4,047,108 | A | * | 9/1977 | Bijker et al. ................ 375/260 |
| 4,091,237 | A | | 5/1978 | Wolnowsky et al. |
| 4,640,134 | A | * | 2/1987 | Simmons ..................... 73/648 |
| 4,783,805 | A | | 11/1988 | Nishio et al. |
| 4,905,285 | A | | 2/1990 | Allen et al. |
| 5,136,267 | A | * | 8/1992 | Cabot .......................... 333/174 |
| 5,228,088 | A | | 7/1993 | Kane et al. |
| 6,130,949 | A | | 10/2000 | Aoki et al. |
| 6,703,825 | B1 | | 3/2004 | Creek et al. |
| 7,076,433 | B2 | * | 7/2006 | Ito et al. ...................... 704/500 |
| 7,377,233 | B2 | | 5/2008 | Patton |
| 2003/0084277 | A1 | | 5/2003 | Przywara et al. |
| 2007/0083365 | A1 | | 4/2007 | Shmunk |

OTHER PUBLICATIONS

Park, Ki-Young and Lee, Soo-Young, An Engineering model of the masking for teh noise-robust speech recognition, 2003, Brain Science Research and Dept. of Electrical Engineering and Computer Science, Korea Advanced Inst. of Science and Technology.*

(Continued)

Primary Examiner—Richemond Dorvil
Assistant Examiner—Douglas C Godbold
(74) Attorney, Agent, or Firm—Fenwick & West LLP

(57) ABSTRACT

One embodiment of the present invention provides a method of determining an evidence value capturing whether two band-pass signals are harmonics of a common fundamental frequency. A further embodiment of the present invention evaluates the distance between significant points of a signal such as a sinusoidal signal. One embodiment of the present invention provides a method of determining whether two or more band-pass signals are harmonics of a fundamental frequency, comprising evaluating a first distance between a first set of two or more significant points of a first band-pass signal, evaluating a second distance between a second set of two or more significant points of a second band-pass signal, and comparing the first distance to the second distance to determine whether the first and second signals are harmonics of the fundamental frequency.

19 Claims, 4 Drawing Sheets

OTHER PUBLICATIONS

European Search Report, European Application No. 04017773, Jun. 21, 2005, 4 pages.

European Search Report, European Application No. 04019076, Nov. 19, 2004, 2 pages.

Grossberg, S. et al., "Artstream: A Neural Network Model of Auditory Scene Analysis and Source Segregation," Neural Networks, 2004, pp. 511-536, vol. 17, Elsevier Ltd.

Hu, G. et al., "On Amplitude Modulation for Monaural Speech Segregation," IEEE, 2002, pp. 69-74.

Jinachitra, P., "Constrained EM Estimates for Harmonic Source Separation," IEEE, 2003, pp. VI-609-VI-612.

Virtanen, T. et al., "Separation of Harmonic Sound Sources Using Sinusoidal Modeling," IEEE, 2000, pp. 765-768.

De Cheveigne, A., "Pitch Perception Models," To appear in Plack, C. and Oxenham, A. (eds), Pitch, New York, Springer Verlag, 2004.

Hu, G. et al., "Monaural Speech Segregation Based on Pitch Tracking and Amplitude Modulation," IEEE Transactions on Neural Networks, Sep. 2004, pp. 1135-1150, vol. 15, No. 5.

Langner, G. et al., "Frequency and Periodicity are Represented in Orthogonal Maps in the Human Auditory Cortex: Evidence from Magnetoencephalography," Journal of Computational Physiology A, 1997, pp. 665-676.

Elghonemy, M. et al., "An Iterative Method for Formant Extraction Using Zero-Crossing Interval Histograms," IEEE MELECON '95, vol. II: Digital Signal Processing, 1985, pp. 155-162.

European Search Report, EP 05004066, Jun. 3, 2005, 5 pages.

Gerhard, D., "Pitch Extractions and Fundamental Frequency: History and Current Techniques," Department of Computer Science, University of Regina, Nov. 2003, pp. 1-22, Regina, Saskatchewan, Canada.

Hess, W., "A Pitch-Synchronous Digital Feature Extraction System for Phonemic Recognition of Speech," IEEE Transactions on Acoustics, Speech, and Signal Processing, Feb. 1976, vol. ASSP-24, No. 1.

Kedem, B., "Spectral Analysis and Discrimination by Zero-Crossings," Proceedings of the IEEE, Nov. 1986, vol. 74, No. 11.

Liu, Y., "A Robust 400-bps Speech Coder Against Background Noise," IEEE, 1991, pp. 601-604.

Ohmura, H., "Fine Pitch Contour Extraction by Voice Fundamental Wave Filtering Method," IEEE, 1994, pp. II-189-II-192.

Kaminsky, I. et al., "Automatic Source Identification of Monophonic Musical Instrument Sounds," Proceedings, IEEE International Conference on Neural Networks, Nov./Dec. 1995, pp. 189-194. vol. 1.

Vincent, E. et al., "A Tentative Topology of Audio Source Separation Tasks," in 4th International Symposium on Independent Component Analysis (ICA 2003), Nara, Japan, Apr. 2003, pp. 715-720.

* cited by examiner

SYSTEM AND METHOD FOR DETERMINING A COMMON FUNDAMENTAL FREQUENCY OF TWO HARMONIC SIGNALS VIA A DISTANCE COMPARISON

CROSS-REFEFRENCE TO RELATED APPLICATIONS

This application is related to and claims priority from European Patent Applications No. 04 013 275.5 filed on Jun. 4, 2004 and 04 017 773.5 filed on Jul. 27, 2004, which are all incorporated by reference herein in their entirety. This application is related to U.S. patent application Ser. No. 11/142,095, filed on May 31, 2005, entitled "Unified Treatment of Resolved and Unresolved Harmonics" which is incorporated by reference herein in its entirety.

FIELD OF THE INVENTION

The present invention generally relates to the field of signal processing and in particular to the separation of signals from different sources.

BACKGROUND OF THE INVENTION

When making acoustic recordings often multiple sound sources are present simultaneously. These can be different speech signals, noise (e.g. of fans) or similar signals. For further analysis of the signals it is useful to separate these interfering signals. Separation of signals can be used, for example, for speech recognition or acoustic scene analysis. Harmonic signals can be separated in the human auditory system based on their fundamental frequency. See A. Bregman. *Auditory Scene Analysis*. MIT Press, 1990, which is incorporated by reference herein in its entirety. Note that a speech signal in general contains many voiced and hence harmonic segments.

In conventional approaches the input signal is split into different frequency bands via band-pass filters and in a later stage, for each band at each instant in time, an evidence value in the range of 0 and 1 for this band to originate from a given fundamental frequency is calculated, where a simple unitary decision can be interpreted as using binary evidence values. By doing so a three dimensional description of the signal is obtained with the following axes: fundamental frequency, frequency band, and time. A similar kind of representation is also found in the human auditory system. See G. Langner, H. Schulze, M. Sams, and P. Heil, The topographic representation of periodicity pitch in the auditory cortex, *Proc. of the NATO Adv. Study Inst. on Comp. Hearing*, pages 91-97, 1998, which is incorporated by reference herein in its entirety. Based on these beforehand calculated evidence values, groups of bands with common fundamental frequency can be formed. Hence in each group the harmonics emanating from one fundamental frequency and therefore belonging to one sound source are present. By this means the separation of the sound sources can be accomplished.

A crucial step in the separation of sound sources is determining whether two harmonics emanate from a common fundamental frequency and hence from a single sound source. In conventional approaches this is done via the auto-correlation function. See G. Hu and D. Wang, Monaural speech segregation based on pitch tracking and amplitude, *IEEE Trans. On Neural Networks*, 2004, which is incorporated by reference herein in its entirety. For each frequency band the auto-correlation is determined and frequencies being in a harmonic relation will share peaks in the lag domain. Hereby also a peak occurs at the lag corresponding to the frequency of the harmonic and multiples of this lag. Further, biological principles for sound source separation are also known. See B. Moore *An Introduction to the Psychology of Hearing*. Fifth Edition, Academic Press, 2003, which is incorporated by reference herein in its entirety. However, conventional techniques do not provide high precision and are unable to identify when signals do not emanate from one common fundamental but are only coincidentally close to a harmonic relation.

What is needed are more efficient techniques for separating signals from different sound sources.

SUMMARY OF THE INVENTION

One embodiment of the present invention provides efficient techniques for separating signals from different sources, such as sound sources. A further embodiment of the present invention provides a method for efficiently determining whether two harmonics emanate from a fundamental frequency. A still further embodiment of the present invention provides a method for efficiently determining whether two frequency bands originate from a single source, such as a sound source. One embodiment of the present invention provides efficient techniques for separating signals from different sources by phase locking, i.e. a synchronization with the phase of the input signal.

One embodiment of the present invention provides techniques for determining whether two frequency components originate from a common fundamental frequency. One embodiment of the present invention can be used for separating acoustic sound sources in monaural recordings based on their underlying fundamental frequencies. Another embodiment of the present invention applies to separating other signals, such as those originating from pressure sensors.

One embodiment of the present invention provides a method of determining an evidence value capturing whether two band-pass signals are harmonics of a common fundamental frequency. One embodiment of the present invention is based on the harmonic relation of frequencies covered by underlying band-pass filters. A further embodiment of the present invention evaluates the distance between significant points of a signal such as a sinusoidal signal.

One embodiment of the present invention provides a method of determining whether two or more band-pass signals are harmonics of a fundamental frequency, comprising evaluating a first distance between two or more significant points of a first band-pass signal, evaluating a second distance between two or more significant points of a second band-pass signal, and comparing the first distance to the second distance to determine whether the first and second signals are harmonics of the fundamental frequency. According to a further embodiment of the present invention, at least one of the first band-pass signal and the second band-pass signal includes a signal at the fundamental frequency or a signal at a harmonic of the fundamental frequency.

According to one embodiment of the present invention, significant points comprise the zero crossings or the maxima or minima or threshold-crossing of the signals. One embodiment of the present invention uses zero crossings of the signal under investigation to obtain the synchronization with the phase of the input signal. For example, zero crossings from negative to positive or from positive to negative or both are used. According to a further embodiment of the present invention, other points of the sinusoidal curve like the maxima or minima or the intersection points with a constant value are used.

According to a still further embodiment, evaluating the distance between these significant points performs an auto synchronization between the two harmonics under investigation, for example by compensating for the frequency dependent delay introduced by the vocal tract in the case of speech signals.

According to one embodiment of the present invention, a comparison of the first signal to the second signal is mapped to an evidence value via a nonlinear function. For example, the non-linear function can have a range between 0 to 1.

According to a further embodiment of the present invention, all components of an input signal are compared to all signals being possible fundamental frequencies and all possible harmonics to each other. For example, the two or more band-pass signals are part of an input signal.

Another embodiment of the present invention provides a method to suppress erroneous correspondences between two signals by generating an inhibitory signal if a correspondence is found which could also create a correspondence with a different harmonic, wherein lower fundamental frequencies and their correspondences inhibit higher fundamental frequencies. A further embodiment of the present invention moves the evidence values of harmonics from a non-dominant fundamental frequency, but being in a harmonic relation to the dominant fundamental frequency, to the dominant fundamental frequency and the corresponding harmonic. For example, the relation $f_0$, $4f_0$ suppresses $f_0'=2f_0$, $2f_0'=4f_0$. A further embodiment of the present invention suppresses an erroneous determination that the first and second band-pass signals are harmonics of a fundamental frequency by generating an inhibitory signal upon determining that at least one of the first band-pass signal or the second band-pass signal is a harmonic of a different fundamental frequency. According to a still further embodiment of the present invention, suppression of an erroneous determination occurs when the different fundamental frequency is lower than the fundamental frequency.

One embodiment of the present invention provides a method to suppress cross-talk between adjacent band-pass filter channels by applying a Mexican hat filter along the frequency axis.

One embodiment of the present invention provides a computer software product implementing the techniques of the present invention when running on a computing device.

One embodiment of the present invention is applied to separate acoustic sound sources in monaural recordings based on their underlying fundamental frequency. A further embodiment of the present invention is applied to separate a noise from a signal source. A still further embodiment of the present invention is applied to separate one or more signal components originating from one or more sources.

One embodiment of the present invention provides a system for determining whether two or more band-pass signals are harmonics of a fundamental frequency, comprising a first evaluating means for evaluating a first distance between a first set of two or more significant points of a first band-pass signal; a second evaluating means for evaluating a second distance between a second set of two or more significant points of a second band-pass signal; and means for comparing the first distance to the second distance to determine whether the first and second band-pass signals are the harmonics of the fundamental frequency.

DETAILED DESCRIPTION OF THE PREFERRED EMBODIMENTS

Figure 1:
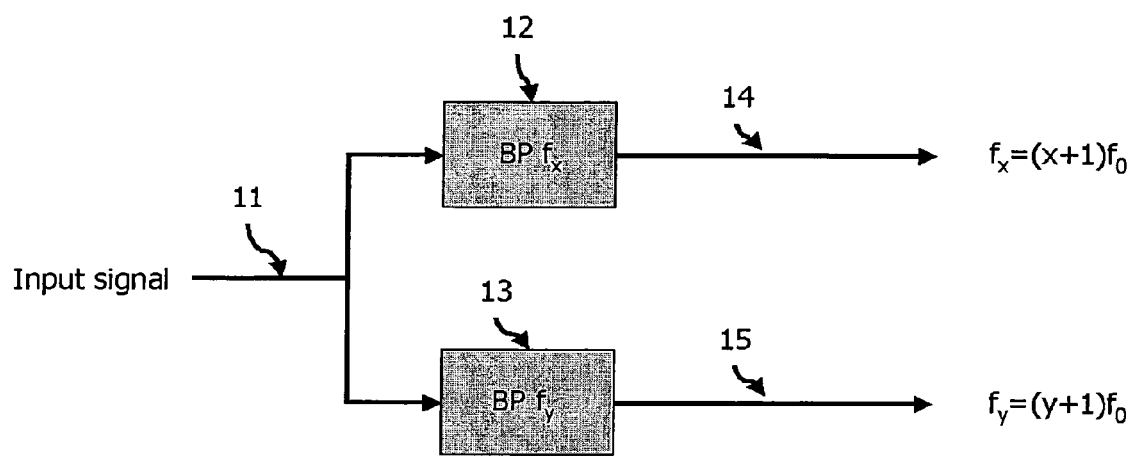
FIG. 1 shows a system for obtaining two frequency bands filtered from an input signal according to one embodiment of the present invention.

FIG. 1 shows a system for obtaining two frequency bands 14, 15 filtered from an input signal 11 according to one embodiment of the present invention. One embodiment of the present invention determines whether the two frequency bands 14, 15 originate from the same fundamental frequency. According to one embodiment, the frequency band 14 contains the fundamental frequency. According to another embodiment, the actual fundamental frequency is not present in the two frequency bands and a comparison is performed between harmonic signals. A further embodiment of the present invention compares signals that do not contain the fundamental frequency, such as some speech signals.

According to one embodiment of the present invention, filter bands in a harmonic relation are compared to determine whether two signals 14, 15 emanate from a single source or to determine whether two or more band-pass signals are harmonics of a fundamental frequency. According to a further embodiment, the signal 14 contains the fundamental frequency. According to a still further embodiment, the harmonic order the two signals can possibly have is known in advance, such that the following three parameters are known when determining whether the two signals 14, 15 derive from the same fundamental frequency: $f_0$, which is the frequency of the fundamental the comparison is based on; $f_x=(x+1)*f_0$, which is the frequency of the first signal 14 that is possibly the $x^{th}$ harmonic of the fundamental; and $f_y=(y+1)*f_0$, which is the frequency of the second signal 15 that is possibly the $y^{th}$ harmonic of the fundamental.

According to one embodiment of the present invention, input signal 11, for example a sound signal, is fed to two band-pass filters 12, 13. According to a further embodiment, each band-pass filter 12, 13 transmits frequencies within a small band around the frequencies $f_x$ and $f_y$ respectively. The resulting signals are the two filter bands 14, 15 whose harmonic relation is to be tested.

One embodiment of the present invention, called phase locking, targets a synchronization with the phase of the input signal. According to one embodiment, this is achieved by evaluating the distance between significant points of the filter bands 14, 15.

Figure 2:
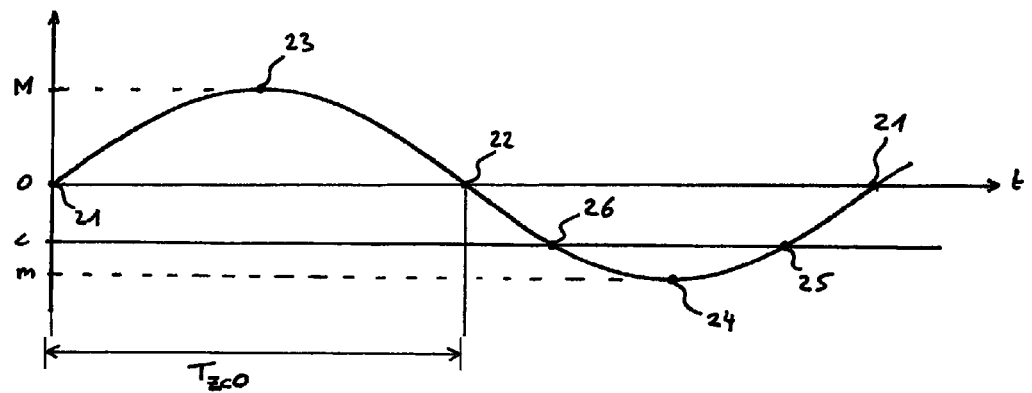
FIG. 2 shows exemplary significant points of frequency bands according to one embodiment of the present invention.
Figure 2:
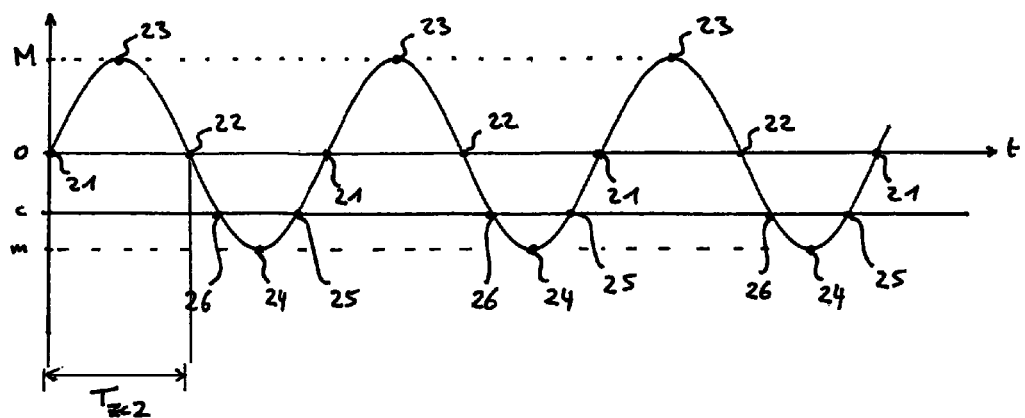

FIG. 2 shows exemplary significant points of frequency bands according to one embodiment of the present invention. According to one embodiment of the present invention, significant points comprise the zero crossings of the signals 14, 15 from negative to positive values 21 and/or from positive to negative values 22. According to another embodiment, significant points comprise the local maxima 23 and/or minima 24 values. According to a further embodiment, significant points comprise the intersection of the signals 14, 15 with a constant c from lower to higher values 25 and/or inversely 26.

One embodiment of the present invention compares whether significant points, for example the zero crossings, in the two filter bands 14, 15 under investigation are synchronous. According to one embodiment, this is accomplished by measuring the distance between significant points in both filter bands 14, 15. While doing so it is taken into account that for higher harmonics zero crossings are closer together than for the fundamental.

According to one embodiment of the present invention, FIG. 2 shows the zero crossing distances $T_{zc0}$ $T_{zc2}$ for different frequencies. For example, two signals having a frequency $f_0$ and $f_2=3f_0$ are considered to be the fundamental and the corresponding second harmonic respectively. Note that the zero crossing distance $T_{zc2}$ of the signal $f_2$ is three times smaller than the zero crossing distance $T_{zc0}$ of the signal $f_0$.

Figure 3:
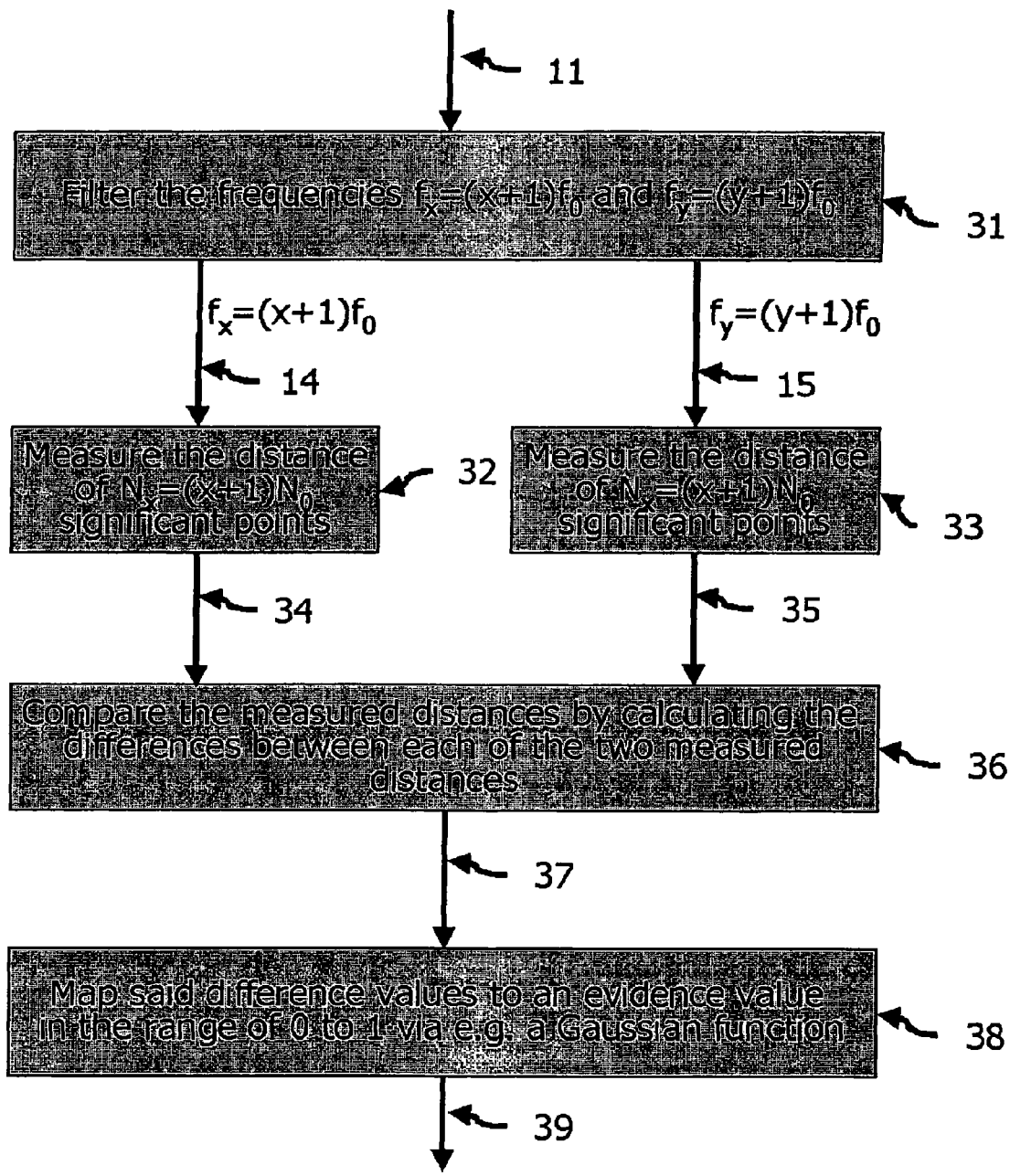
FIG. 3 shows a method for determining whether two frequency components originate from a common fundamental frequency according to one embodiment of the present invention.
Figure 4:
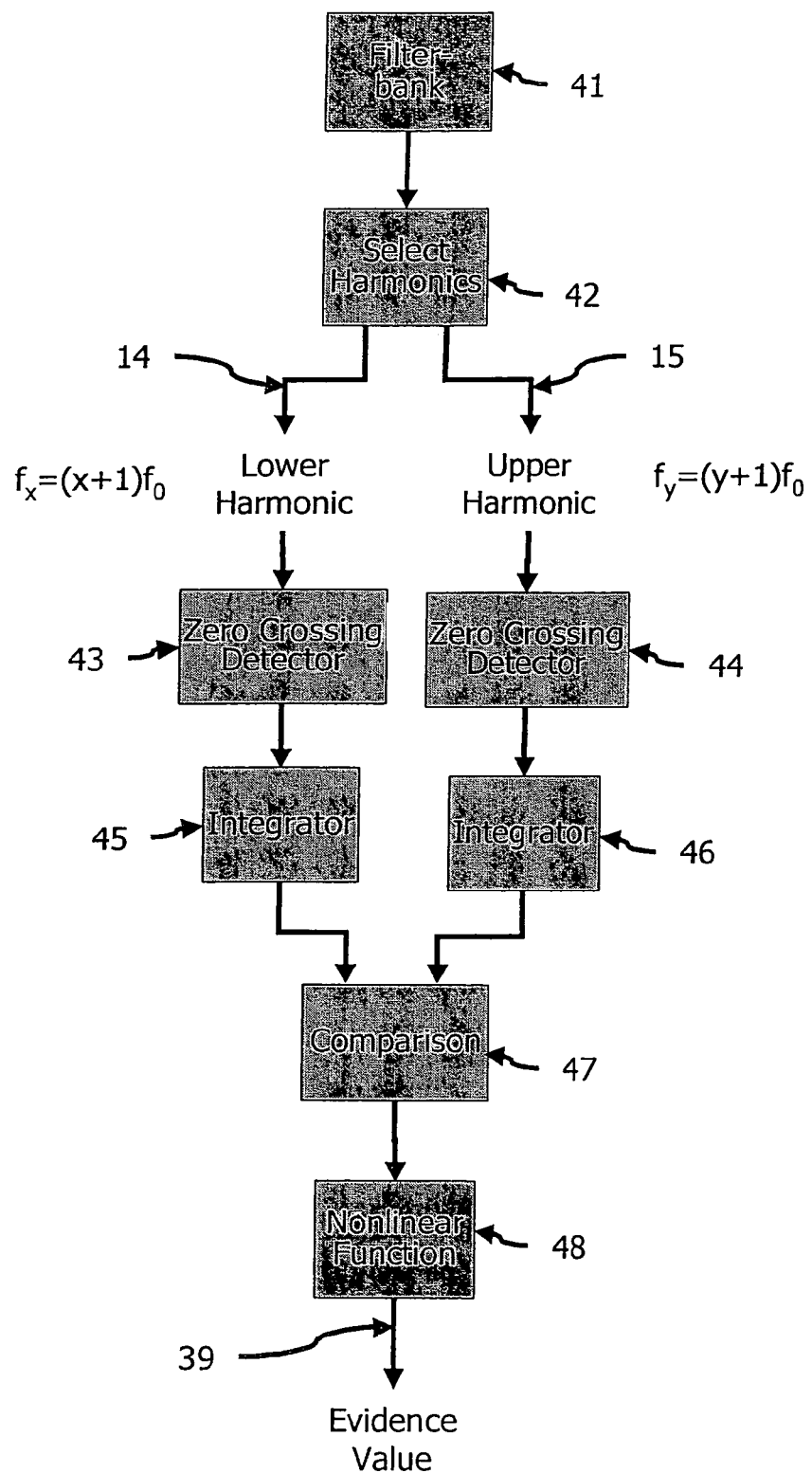
FIG. 4 shows a system for determining an evidence value of the common origin of two harmonic signals according to one embodiment of the present invention.

Referring to FIGS. 3 and 4, it is now explained how to determine whether two signals emanate from a single source according to one embodiment of the present invention.

FIG. 3 shows a method for determining whether two frequency components originate from a common fundamental frequency according to one embodiment of the present invention. As shown in FIG. 3, the method starts by filtering 31 an input signal 11 to generate two frequency bands to test 14, 15.

According to one embodiment, next the distance of or between significant points is measured 32, 33 for the two signals 14, 15. An important parameter is the number of successive significant points that should be taken into account. According to one embodiment of the present invention, as the frequency of the signals 14, 15 is different, the number of points is adapted for each signal. According to a further embodiment, the number of point $N_x$ for the band $f_x=(x+1)f_0$ is obtained by considering the potential harmonic order of said frequency band according to equation (1) below, where $N_0$ and $N_x$ are the number of significant points of the bands $f_0$ and $f_x=(x+1)f_0$ respectively for which the distance is measured, and x is the potential harmonic order of the frequency band $f_x$ for the fundamental band $f_0$ $$N_x = N_0(x+1) \quad (1)$$

Next, the measured distances 34, 35 are compared 36 by calculating their difference 37. According to one embodiment, if the calculated difference 37 is less than a given threshold value, it is assumed that the two frequency bands 14, 15 are harmonics of the same fundamental, wherein the frequency band 14 can also be that fundamental frequency.

Next, according to one embodiment of the present invention, the calculated difference 37 is mapped 38 to an evidence value 39. According to a further embodiment, mapping 38 is done according to a Gaussian function. According to a still further embodiment, the evidence value 39 can have a range between 0 to 1, and the evidence value 39 reflects the fact that the two frequency bands 14, 15 are harmonics of the same fundamental or not.

FIG. 4 shows a system for determining an evidence value of the common origin of two harmonic signals according to one embodiment of the present invention. FIG. 4 shows a filterbank 41 that is used to selectively filter the input signal into frequency bands according to one embodiment of the present invention. According to a further embodiment, from the outputs of the filter-bank 41, two harmonic signal are selected 42: a lower harmonic 14 $f_x=(x+1)f_0$ and a upper harmonic 15 $f_y=(y+1)f_0$.

According to one embodiment, each filtered harmonic 14, 15 is respectively fed into a zero crossing detector 43, 44 and into an integrator 45, 46. According to one embodiment, zero crossing detectors 43, 44 measure the significant points that are zero crossings. Other embodiments of the present invention provide detectors adapted to track other significant points such that local maxima 23, local minima 24, and/or intersections of the signals 14, 15 with a constant c from lower to higher values 25 and/or from higher to lower values 26.

According to one embodiment of the present invention, detected zero crossings 43, 44 are passed to integrators 45, 46 to measure the distance of or between respectively $N_x$ and $N_y$ significant points. According to a further embodiment, a comparator 47 compares the output of integrators 45, 46. According to a still further embodiment, a nonlinear function 48 then generates an evidence value 39 on the basis of the comparison 47. For example, the nonlinear function 48 is a Gaussian function that maps the comparison 47 to an evidence value 39, which can, for example, have a range between 0 to 1.

One embodiment of the present invention uses an expected distance between significant points of the underlying fundamental as a basis for the measurement. According to one embodiment, for the two frequency bands 14, 15 the distance between as many zero crossings as we expect from the harmonic order of the signals under investigation is measured, for example the distance between consecutive zero crossings for $f_0$, or the distance between 3 zero crossings for 2 $f_0$. According to a further embodiment, the distances of or between these zero crossings are compared for both filter bands 14, 15 under investigation.

According to one embodiment of the present invention, based on the difference between two significant point measures, for example two zero crossing measures, it is determined whether the two signals 14, 15 emanate from the same fundamental. According to one embodiment, if the difference is close to zero or below a given lower threshold value the two signals 14, 15 are likely to emanate from the same fundamental and hence the evidence value is high. According to a further embodiment, if the difference is large, for example large compared to an upper threshold value, they are unlikely to stem from the same fundamental and hence the resulting evidence value is low.

According to one embodiment of the present invention, mapping of distances to evidence values is done by a nonlinear function, for example a Gaussian function in the range of 0 and 1. Note that, due to a common origin of the fundamental frequency and the corresponding harmonics, such as a glottal excitation signal, the fundamental frequency and its harmonics are synchronous. However, this synchronicity may be disturbed by the influence of the vocal tract, which induces a frequency dependent delay depending on the current articulation. According to one embodiment of the present invention, tracking of the differences of the significant points, such as zero crossings, provides an adaptive cancellation of this delay by performing an automatic synchronization of the two harmonics under investigation.

According to one embodiment of the present invention, the correspondence of two signals 14, 15 can also be detected when the frequency of the underlying fundamental and hence the frequencies of the harmonics change as they will change in a similar manner and therefore the relative distance of or between the zero crossings is not affected.

According to one embodiment of the present invention, the calculated evidence values are marked in a 3 dimensional space for fundamental frequency, filter band, and time. According to a further embodiment, the last calculated evidence value is, for each signal under investigation, added in the 3 dimensional space on the fundamental frequency axis at the position of the supposed underlying fundamental frequency and on the frequency band axis at the position of the frequency band corresponding to the signal.

According to one embodiment, the resulting evidence value gives us a measure of the relation of the two signals for one period of the fundamental. According to a further embodiment, for calculation of this evidence value for the next period of the fundamental we start at the last zero crossing used for the last period of the fundamental.

When using the auto-correlation, the width of the peaks in the auto-correlation, hence the basis of the evaluation of the harmonic relation of the signals, depends on the frequency of the signal. Signals with low frequency have wide peaks and hence the measurement is very coarse. One embodiment of the present invention provides the advantage that the resolution of the measurement depends only on the distance of or between the sampling points and hence on the sampling rate. This precision is better than when using auto-correlation. Therefore, in contrast to the auto-correlation method, one embodiment of the present invention is able to tell apart two signals 14, 15 that do not emanate from one common fundamental but are only coincidentally close to a harmonic relation.

According to one embodiment of the present invention, during the comparisons, the actual fundamental frequency and the possible harmonics 14, 15 are treated identically. Therefore, according to one embodiment, comparisons between a fundamental and its possible harmonics are performed. According to a further embodiment, comparisons between possible harmonics of a fundamental are performed. According to one embodiment, when performing comparison of filter bands the possible fundamental frequency values are discretized with the center frequencies of the band-pass filters used for decomposition of the signal, which maintains the versatility of one embodiment of the present invention because assignment of signal components to different sources is also based on frequency bands. Further, according to one embodiment of the present invention, a more precise evaluation of the fundamental frequency can be achieved by using the actual values of the difference of significant points such as zero crossings.

An upper frequency bound according to one embodiment of the present invention is determined by the sampling rate used. For example, the sampling rate is chosen to avoid a situation where no meaningful evidence values can be calculated because the frequency of the signal under investigation is too high compared to the sampling rate. According to one embodiment of the present invention, the sampling rate is adjusted based on the frequency of the signal under investigation such that significant points, such as zero crossings, remain far enough for meaningful evidence values to be calculated. According to a further embodiment of the present invention, an actual value of the minimal distance of or between significant points also depends on the noise in the input signals. A exemplary value when using only either positive to negative or negative to positive zero crossings is 4 samples, which results in an upper frequency bound of one fifth of the sampling frequency.

According to one embodiment of the present invention, by comparing all possible fundamental frequencies in a certain range (e.g. 50-1000 Hz) with all harmonics (based on the sampling rate) and all harmonics to each other, multiple cues for one given signal to emanate from a given fundamental frequency can be obtained. According to a further embodiment, to counterbalance this excitatory effect and because a harmonic emanates from one fundamental frequency, an inhibitory process is used. For example, if the harmonic $4f_0$ is identified to emanate from $f_0$ the possible fundamental frequency $f_0'=2f_0$ receives inhibitory input. By doing so, according to one embodiment of the present invention it is postulated that the fundamental frequency with the lowest frequency is the more likely one. According to a further embodiment, the inhibitory input is the negative of the excitatory input.

According to one embodiment of the present invention, after comparing all combinations of possible harmonics the dominant fundamental frequency at a given instant in time is determined by summing the evidence values of all frequency bands. According to a further embodiment, when the dominant fundamental frequency is determined, in a second inhibition stage all evidence values of non-dominant fundamental frequencies that are in a harmonic relation to the dominant fundamental are moved to the dominant fundamental frequency and the corresponding harmonic. According to one embodiment of the present invention, these erroneous evidence values for the non-dominant fundamental frequency are a consequence of the harmonic relation between the dominant and non-dominant fundamental frequency, which results in their similarity to the true fundamental frequency by the distance measure of the significant points, such as zero crossings.

According to one embodiment of the present invention, when using band-pass filters to decompose the input signal, a harmonic generates responses in the filter with its center frequency closest to the frequency of the harmonic, but due to the limited selectivity of the filters also weaker responses in the neighboring filters. One embodiment of the present invention reduces this cross-talk by applying a Mexican hat filter along the frequency axis in a way that the envelope of adjacent band-pass signals is filtered. According to a further embodiment, central peak of the filter is chosen to be wider than 1 so as to avoid disturbing changes of the frequency of the harmonics and hence transitions of the main response of the harmonic from one filter channel to the other.

The present invention may be embodied in various forms and should not be construed as limited to the embodiments set forth herein. Rather, these embodiments are provided so that disclosure will be thorough and complete and will fully convey the invention to those skilled in the art. Further, the apparatus and methods described are not limited to rigid bodies. While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without department from the spirit and scope of the invention as it is defined in the appended claims.

What is claimed is:

1. A computer-implemented method of determining whether two or more band-pass signals of an input acoustic signal includes harmonics of a fundamental frequency, comprising:
   in a computing device, receiving the input signal;
   in the computing device, filtering the input acoustic signal by a first band-pass filter to obtain a first band-pass signal, a center frequency of the first band-pass signal being a first multiple of the fundamental frequency;
   in the computing device, filtering the input acoustic signal by a second band-pass filter to obtain a second band-pass signal, a center frequency of the second band-pass signal being a second multiple of the fundamental frequency;

in the computing device, measuring first distances between a first set of two or more significant points of the first band-pass signal, the first set being adapted according to an assumed harmonic order of the first band-pass signal;

in the computing device, measuring second distances between a second set of two or more significant points of the second band-pass signal, the second set being adapted according to an assumed harmonic order of the second band-pass signal;

wherein each of said significant points is one of a zero crossing point, a local maxima, a local minima or a threshold crossing of said first band pass signal; the computing device, comparing the first and second measured distances by calculating differences between each of the measured distances to determine difference values;

in the computing device, determining that the first band-pass signal and the second band-pass signal are harmonics of a same fundamental frequency in response to the calculated difference values being below a predetermined threshold value; and in the computing device, mapping the calculated difference values to an evidence value in the range of zero to one, wherein the evidence values represent whether the first band-pass signal and the second band-pass signal are harmonics of the same fundamental frequency.

2. The method of claim 1, wherein said mapping of the calculated differences to the evidence value is performed via a non-linear function.

3. The method of claim 2, wherein the fundamental frequency is a non-dominant fundamental frequency in harmonic relation to a dominant fundamental frequency, further comprising moving the evidence value from the fundamental frequency to the dominant fundamental frequency.

4. The method of claim 1, wherein at least one of the first band-pass signal and the second band-pass signal includes:
a signal at the fundamental frequency; or
a signal at a harmonic of the fundamental frequency.

5. The method of claim 1, wherein an input acoustic signal comprises the two or more band-pass signals, and wherein the method is repeated to determine whether the two or more band-pass signals are the harmonics of one or more possible fundamental frequencies.

6. The method of claim 1, further comprising suppressing an erroneous determination that the first and second band-pass signals are the harmonics of the fundamental frequency by generating an inhibitory signal upon determining that at least one of the first band-pass signal or the second band-pass signal is a harmonic of a different fundamental frequency.

7. The method of claim 6, wherein the different fundamental frequency is lower than the fundamental frequency.

8. The method of claim 1, further comprising applying a Mexican hat filter along a frequency axis to suppress cross-talk between adjacent band-pass filter channels.

9. The method of claim 1, wherein the comparing the first distances to the second distances performs an auto-synchronization between the first band-pass signal and the second band-pass signal by compensating for a frequency dependent delay.

10. The method of claim 1, applied to perform at least one of:
separating one or more acoustic sound sources in a monaural recording based on one or more underlying fundamental frequencies;
separating a noise from a signal source; or
separating one or more signal components originating from one or more sources.

11. A system for determining whether two or more band-pass signals are harmonics of a fundamental frequency in an input acoustic signal, the system comprising a computing device and a computer software product, the computing device comprising:

a first band-pass filter for filtering the input acoustic signal to obtain a first band-pass signal, a center frequency of the first band-pass signal being a first multiple of the fundamental frequency;

a second band-pass filter for filtering the input acoustic signal to obtain a second band-pass signal, a center frequency of the second band-pass signal being a second multiple of the fundamental frequency;

first evaluator for measuring first distances between a first set of two or more significant points of the first band-pass signal, the first set being adapted according to an assumed harmonic order of the first band-pass signal;

second evaluator for measuring second distances between a second set of two or more significant points of the second band-pass signal, the second set being adapted according to an assumed harmonic order of the second band-pass signal;

wherein each of said significant points is one of a zero crossing point, a local maxima, a local minima or a threshold crossing of said first band pass signal;

a comparator for comparing the first and second measured distances by calculating differences between each of the measured distances to determine difference values, the comparator determining that the first band-pass signal and the second band-pass signal are harmonics of a same fundamental frequency in response to the calculated difference values being below a predetermined threshold value; and a function module mapping the calculated difference values to an evidence value in the range of zero to one, wherein the evidence values represent whether the first band-pass signal and the second band-pass signal are harmonics of the same fundamental frequency.

12. The system of claim 11, wherein the function module maps comparison of the first distances and the second distances to the evidence value via a non-linear function.

13. The system of claim 11, wherein at least one of the first band-pass signal and the second band-pass signal includes:
a signal at the fundamental frequency; or
a signal at a harmonic of the fundamental frequency.

14. The system of claim 11, wherein an input acoustic signal comprises the two or more band-pass signals, further comprising means for determining whether the two or more band-pass signals are the harmonics of one or more possible fundamental frequencies.

15. The system of claim 11, wherein the computing device comprising means for suppressing an erroneous determination that the first and second band-pass signals are the harmonics of the fundamental frequency by means for generating an inhibitory signal upon determining that at least one of the first band-pass signal or the second band-pass signal is a harmonic of a different fundamental frequency.

16. The system of claim 15, wherein the different fundamental frequency is lower than the fundamental frequency.

17. The system of claim 11, wherein the computing device comprising means for applying a Mexican hat filter along a frequency axis to suppress cross-talk between adjacent band-pass filter channels.

18. The system of claim 11, wherein the comparator performs an auto-synchronization between the first band-pass signal and the second band-pass signal by means for compensating for a frequency dependent delay.

19. The system of claim 11, wherein the computing device further comprises at least one of:
first separating means for separating one or more acoustic sound sources in a monaural recording based on one or more underlying fundamental frequencies;

second separating means for separating a noise from a signal source; or third separating means for separating one or more signal components originating from one or more sources.

\* \* \* \* \*